May 18, 1965  W. A. WEST  3,183,585
METHOD FOR REPLACING BUSHINGS
Filed Dec. 31, 1962  2 Sheets-Sheet 1
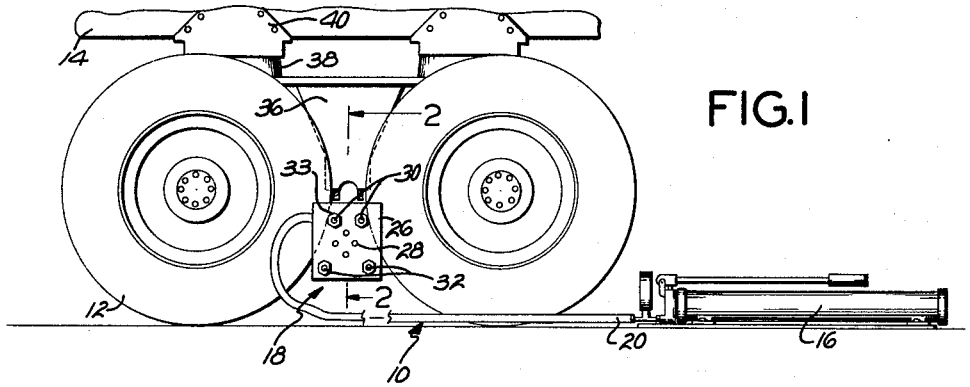
FIG.1
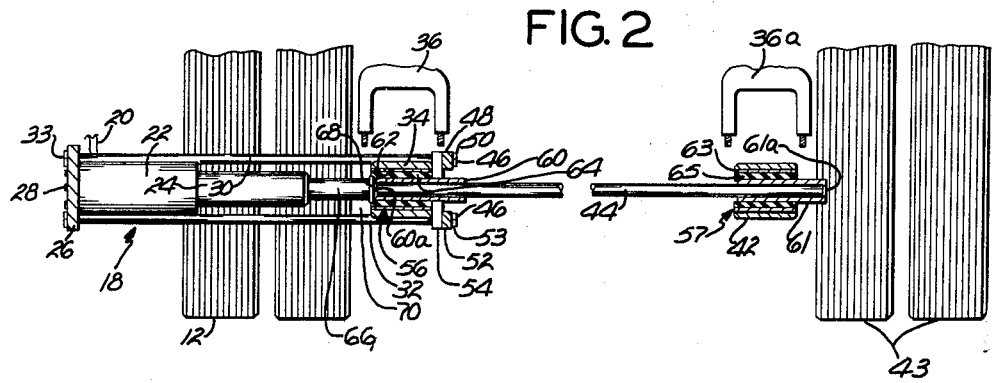
FIG. 2
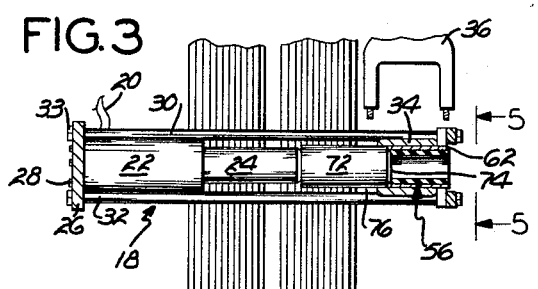
FIG. 3
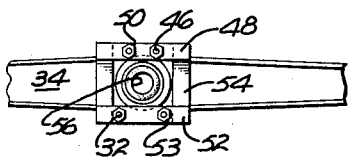
FIG. 5
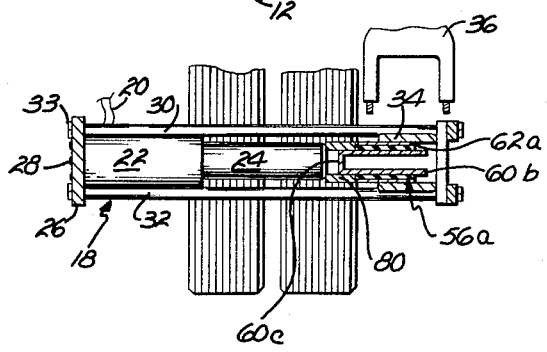
FIG. 4
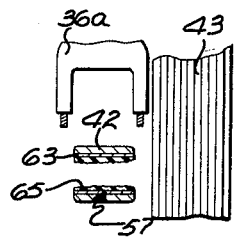
INVENTOR.
WILLIAM A. WEST
BY *R. E. Geangue*
ATTORNEY

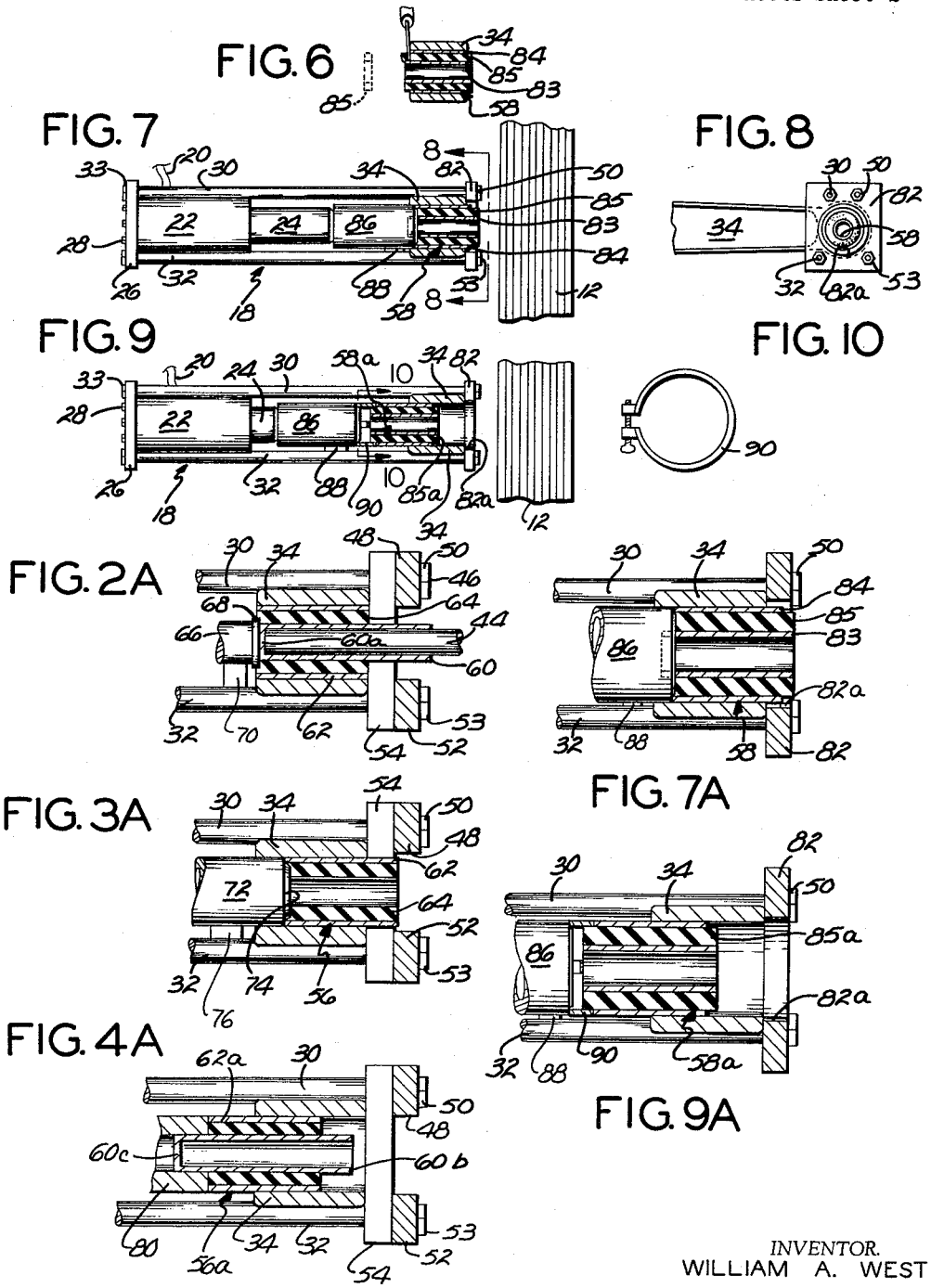

United States Patent Office 3,183,585
Patented May 18, 1965

3,183,585
METHOD FOR REPLACING BUSHINGS
William A. West, San Fernando, Calif.
(10219 Oro Vista, Sunland, Calif.)
Filed Dec. 31, 1962, Ser. No. 248,404
3 Claims. (Cl. 29—401)

This invention relates to a method for replacing bushings and more particularly to a method for replacing worn bushings in the equalizer beams of trucks and trailers having tandem axles.

Some trucks with tandem axles employ equalizing beams to tie the axles together and suspend them from the truck's springs. The equalizing beams employ bushings at the points of connection with the springs and axles. A center bushing connects each equalizing beam to the springs and includes an inner metal core which is closed at one end, an outer metal casing, and an intermediate rubber layer vulcanized to the core and the outer metal casing. The inner metal core extends beyond the ends of the rubber layer and the metal casing. End bushings connect the axles to the ends of the equalizing beams and also have inner metal cores and outer metal casings with rubber in between. The rubber and the inner metal cores extend beyond the outer metal casing an equal amount. A center cross tube extends transversely of the longitudinal axes of the beams, has an end mounted in each center bushing and is retained in position by the closed ends of the cores of the center bushings.

The center bushings are rather difficult to remove because of the cross tube and the limited working space between the tandem wheels on each side of the truck. Therefore, in certain prior art practices it is customary to remove the wheels to make the center bushings accessible after which the closed ends of one bushing core must be burned off to permit removal of the center tube so that the hydraulic ram used to pull the old bushings toward the outside of the truck can be positioned relative to the bushings. Also, it is necessary to install the new bushings before the cross tube is reinstalled making it necessary to cut off the closed end of the new bushing to install the tube and then braze a cap on the core to again close the end of the bushing. Most customers object to this procedure because it is felt that the heat necessary to install the cap injures the rubber portion of the bushing.

Concerning the end bushings, there is only a few inches clearance between the wheels of the truck and the ends of the beams making it necessary to remove the wheels to gain access to the end bushings under conventional methods of replacing them.

Since it takes approximately 30 to 100 tons of pressure to push the center bushings out, hydraulic rams used for this purpose have been so large that they will not fit between the wheels of the truck, making it necessary to remove them.

In view of the foregoing factors and conditions characteristic of apparatus and methods for replacing bushings in truck equalizing beams, it is a primary object of the present invention to provide a new and improved method for replacing bushings not subject to the disadvantages enumerated above and which may be employed to replace bushings on truck equalizing beams safely, expeditiously and efficiently.

Another object of the present invention is to provide a method for replacing the bushings in truck equalizing beams without removing the wheels from the truck.

Yet another object of the present invention is to provide a method for replacing bushings in truck equalizing beams without removing the center cross tube as a preparatory step.

According to the present invention, an hydraulic press is employed having four pull rods which straddle one equalizing beam and the center tube so that end bars may be attached to the pull rods to bear against the inside of the one equalizing beam while the cores at the center bushings of both beams and the cross tube are pushed out together as a unit. The pull rods are spaced in such a manner that the press will fit between the tires without removing the wheels with the upper rods being closer together to clear the truck tires and the lower rods being far enough apart to leave room for the new bushing to be inserted into the press. A special adaptor is then employed with the pull rods to remove the end bushings without removing the wheels from the truck.

The features of the present invention which are believed to be novel are set forth with particularity in the appended claims. The present invention, both as to its organization and manner of operation, together with further objects and advantages thereof, may best be understood by reference to the following description taken in connection with the accompanying drawings, in which:

FIGURE 1 is a side elevational view showing a bushing press of the invention positioned between the wheels of a truck;

FIGURE 2 is a transverse, cross-sectional view, with parts shown in elevation, taken along line 2—2 of FIGURE 1;

FIGURE 2A is a cross-sectional view on an enlarged scale of a detail of FIGURE 2;

FIGURE 3 is a view similar to FIGURE 2 showing a second operational step on one of the bushings shown in FIGURE 2;

FIGURE 3A is a cross-sectional view on an enlarged scale of a detail of FIGURE 3;

FIGURE 4 is a view similar to FIGURE 2 showing a new bushing being installed;

FIGURE 4A is a cross-sectional view on an enlarged scale of a detail of FIGURE 4;

FIGURE 5 is an elevational view taken in the direction of arrows 5—5 of FIGURE 3;

FIGURE 6 is a schematic view of an operational step of the method of the invention;

FIGURE 7 is a schematic view showing the removal of an end bushing;

FIGURE 7A is an enlarged, cross-sectional view showing a detail of FIGURE 7;

FIGURE 8 is an elevational view taken in the direction of arrows 8—8 of FIGURE 7;

FIGURE 9 is a schematic view showing an end bushing being installed;

FIGURE 9A is an enlarged, cross-sectional view of a detail of FIGURE 9; and

FIGURE 10 is an elevational view of a clamp employed with the apparatus of FIGURE 9, the view being taken in the direction of arrows 10—10 of FIGURE 9.

Referring again to the drawings, and particularly to FIGURES 1 and 2, the bushing press of the present invention, generally designated 10, is shown in position relative to the tandem dual wheels 12 of a truck, the frame of which is shown at 14. The bushing press 10 includes an hydraulic pump 16 which is connected to an hydraulic ram 18 by means of a conduit 20. The ram 18 includes a cylinder 22 and a piston 24 which are affixed to a base plate 26 by means of cap screws 28. A pair of upper pull rods 30 and a pair of lower pull rods 32 are affixed to base plate 26 by means of nuts 33. The upper pull rods 30 are positioned close enough together that the ram 18 will fit intermediate the wheels 12 at the point of least clearance between them. The lower pull rods 32, on the other hand, must be spaced further apart for a purpose to be hereinafter explained and this is possible because the wheels 12 have more clearance for the lower rods 32 because of the curvature of the wheels 12. The pull rods 30 and 32 are adapted to straddle an equalizing beam 34 which connects the wheels 12 to truck frame 14 through a saddle 36, rubber-load cushions 38 and spring hangers 40. A second equalizing beam 42 may be attached to a saddle 36a and is employed on the other side of the truck to support another set of tandem dual wheels, one pair of which is shown at 43. A cross tube 44 connects the beams 34 and 42 together. Since, according to the method of the present invention, the cross tube 44 must be left in position while the bushing press 10 is being attached to equalizing beam 34, the ends 46 of pull rods 30 and 32, which are remote from base plate 26, cannot be connected together with a continuous plate. Therefore, the upper pull rods 30 are connected together with an upper end bar 48 which slidably engages the upper pull rods 30 in a horizontal plane and is maintained in position thereon by means of a pair of nuts, one of which is shown at 50. A lower end bar 52 is slidably mounted on the lower pull rods 32 in a horizontal plane and is maintained in position thereon by means of a pair of nuts, one of which is shown at 53. A pair of contact or pressure bars 54 may then be slid into a vertical position behind the outer ends of bars 48 and 52 astraddle cross tube 44 to bear against the equalizing beam 34 when pressure is applied by bushing press 10.

The equalizing beams 34 and 42 carry center bushings 56 and 57, respectively, and each of the beams 34 and 42 carry two end bushings, one of which is shown at 58 in FIGURE 8 for beam 34. The bushings 56 and 57 include inner metal sleeves 60 and 61, outer metal members or sleeves 62 and 63 and intermediate rubber layers 64 and 65, respectively. The rubber layers are vulcanized to both metallic members and the sleeves 60 and 61 have capped ends 60a and 61a, respectively. A rubber-removing tube 66 having a flared end 68 may be employed to remove the sleeve 60 from beam 34 together with a portion of the intermediate rubber layer 64 which is sheared with flare 68 (FIGURES 2 and 2A). The rubber-removing tube 66 is maintained in position between the piston 24 and bushing 56 by means of a suitable block 70 which may be placed horizontally across the lower pull rods 32. As sleeve 60 is driven out of bushing 56, capped end 60a moves cross tube 44 to the right, as viewed in FIGURE 2, causing it to bear against capped end 61a and drive sleeve 61 out of bushing 57.

Referring now to FIGURES 3 and 3A, with the ram 18 still in position on beam 34, the outer metal member 62 and the remaining portion of the intermediate rubber layer 64 are removed with a tubular member 72 having a chamfered end portion 74 which engages the outer metal member 62. The tubular member 72 is moved upwardly between rods 32 and inserted between piston 24 and bushing 56 in place of tube 66 and may be maintained in position by means of a block 76, which is thinner than block 70.

Referring now to FIGURES 4 and 4A, the ram 18 is still left in position and a new bushing 56a may be installed with a center-bushing-installing tube 80 which replaces tube 72 and encompasses the capped end 60c of sleeve 60b so that it will bear against the outer metallic member 62a. The large diameters of bushing 56a and tubes 72 and 80, when considered with the limited working space existing between the peripheral faces of wheels 12, poses quite a problem in moving these items into position between the beam 34 and piston 24. The upper rods 30 are so close together that items of large diameter cannot be inserted between them. However, the lower rods 32, as previously stated, may be spaced further apart than the rods 30 because of the additional clearance between the wheels 12 at their points of receding curvature. This permits moving items of large diameter upwardly between rods 32 and into position between piston 24 and beam 34. After the new bushing 56a has been installed, the press 10 is moved to the other side of the truck, not shown, and attached to beam 42 to remove the outer metal sleeve 63 and remaining portion of rubber layer 65 of bushing 57. A new bushing, not shown, may then be installed.

Referring now to FIGURES 7-9A, the bushing press 10 is converted for use in removing the end bushings 58 by replacing the bars 48, 52 and 54 with a plate 82 which is thin enough to fit between beam 34 and wheel 12 and which has a central aperture 82a approximately the same size as the diameter of the bushing 58. The nuts 50 and 53 are employed to maintain the plate 82 in position on pull rods 30 and 32.

The bushing 58 includes an inner metal sleeve 83, an outer metal sleeve 84 and an intermediate rubber layer 85. The rubber layer 85 and the inner sleeve 83 extend beyond the ends of outer sleeve 84. An end-bushing removing and installing tube 86 may be employed with the bushing press 10 to both remove and install the end bushings 58. The tube 86 is maintained in position by means of a block 88. The protruding portion of the intermediate rubber layer 85 is removed with a suitable knife (FIGURE 6) so that the tube 86 will contact bushing 58 as shown in FIGURE 7A during the removal operation. Then a clamp 90 (FIGURE 10) is employed as shown in FIGURES 9 and 9A to protect the rubber layer 85a of a new bushing 58a during the installing operation.

The bushing press 10 may be used in practising the method of the invention as follows:

The equalizing beams 34 and 42 were lowered away from their respective saddles 36 and 36a and the bushing press 10 was placed in position between the wheels 12 with the pull rods 30 and 32 straddling equalizing beam 34 and cross tube 44. The upper and lower end bars 48 and 52 were then positioned on their respective pull rods and nuts 50 and 53 applied thereto. Contact bars 54 were then placed behind bars 48 and 52 and rubber removing tube 66 was moved upwardly between lower pull rods 32 and placed in position on block 70. Pump 16 was actuated to pressurize cylinder 22 below piston 24 and bring it into contact with rubber removing tube 66, thus forcing it into engagement with the capped end 60a of sleeve 60. The sleeve 60 of bushing 56 is moved to the right, as viewed in FIGURE 2, forcing cross tube 44 to the right. Cross tube 44 bears against end cap 61a on the bushing 57 forcing the sleeve 61 out of the bushing 57. Pumping is continued until the sleeves 60 and 61 clear their respective bushings and are removed together with the cross tube 44. Flange 68 cuts away part of the intermediate layer 64 as sleeve 60 is pushed out. Rubber-cutting tube 66 and block 70 are then replaced with center-bushing removing tube 72 and block 76 while ram 18 remains in position on beam 34. The pump 16 is again actuated to remove the remaining portion of the intermediate rubber layer 64 and the outer metal member 62.

Center-bushing-installing tube 80 was then placed in ram 18 in place of the rubber removing tube 66 and a new bushing 56a was pressed into equalizing beam 34. The ram 18 was then removed from equalizing beam 34 and attached to equalizing beam 42. Center bushing removing tube 72 was then employed to remove the remaining intermediate rubber layer 65 and the outer metallic member 63 of bushing 57. Center-bushing-installing tube 80 was then employed to install a new center bushing, not shown, in equalizing beam 42, care being taken to replace cross tube 44 so that it would seat in the new bushing. The ram 18 was then removed from beam 42 and the bars 48, 52 and 54 were replaced with plate 82. After the protruding portion of rubber layer 85 was trimmed away (FIGURE 6), the ram 18 was hooked over the end of beam 34 with plate 82 engaging beam 34 on its side adjacent wheel 12. The end bushing tube 86 was supported on a block 88 and the pump 16 was actuated to drive the bushing 58 out of beam 34.

The clamp 90 was then placed around the protruding portion of rubber layer 85a on a new bushing 58a to provide a bearing surface for tube 86 and the new bushing 58a was pressed into position. The removing and installing steps were then repeated on the other end of beam 34 and on both ends of beam 42.

It is to be noted that by employing the apparatus of the invention in accordance with the method of the invention, the step of burning off the end cap 61a and removing tube 44 before removing bushing 56 was eliminated together with the step of burning off the end cap 60c on new bushing 56a and then welding it back on after the center tube had been replaced. It is also to be noted that it was not necessary to remove the beams or wheels 12 to get access to either the center bushings or the end bushings.

While the particular bushing press and method of removing and installing bushings herein shown and described in detail are fully capable of attaining the objects and providing the advantages hereinbefore stated, it is to be understood that they are merely illustrative of the presently preferred embodiments of the invention and that no limitations are intended to the details of construction, design or method steps herein shown and described other than as defined in the appended claims.

What is claimed is:

1. A method of replacing the center bushings in the equalizing beams of trucks having tandem wheels, one set of said wheels being connected to the rear ends of said beams, the other set of said wheels being connected to the front ends of said beams, said beams having center bushings connecting the beams to the springs of said truck, said center bushings including capped metal cores, metal outer members and intermediate resilient layers connecting said cores and said outer members together, a cross tube mounted between said beams and having its ends mounted in said cores, said cross tube being retained in position by said caps, said method comprising the steps of:

disconnecting said bushings from said springs;
applying a first force to the capped core of one of said bushings to push both of said capped cores and said cross tube out of said beams as a unit;
applying a second force to the metal outer member of said one bushing to push it out of one of said beams;
installing a first new bushing in said one beam; applying a force to the outer metal member of said other bushing to push it out of the other beam;
inserting said cross tube through said other beam into said first new bushing; and
installing a second new bushing in said other beam with the core of said second new bushing encompassing said cross tube.

2. A method of replacing the center bushings in the equalizing beams of trucks having tandem wheels, one set of said wheels being connected to the rear ends of said beams, the other set of said wheels being connected to the front ends of said beams, said beams having center bushings connecting the beams to the springs of said truck, said center bushings including capped metal cores, metal outer members and intermediate resilient layers connecting said cores and said outer members together, a cross tube mounted between said beams and having its ends mounted in said cores, said cross tube being retained in position by said caps, said method comprising the steps of:

disconnecting said bushings from said springs;
applying a first force to the capped core of one of said bushings to push both of said capped cores and said cross tube out of said beams as a unit;
applying a second force to the metal outer member of said one bushing to push it out of one of said beams; and
applying a force to the outer metal member of said other bushing to push it out of the other beam.

3. A method of replacing the center and end bushings in the equalizing means in trucks having tandem wheels, one set of said wheels being connected to the rear ends of said beams, the other set of said wheels being connected to the front ends of said beams, said beams having center bushings connecting the beams to the springs of said truck, said center bushings including capped metal cores, metal outer members and intermediate resilient layers connecting said cores and said outer members together, a cross tube mounted between said beams and having its ends mounted in said cores, said cross tube being retained in position by said caps, said method comprising the steps of:

disconnecting said bushings from said springs;
applying a first force to the capped core of one of said bushings to push both of said capped cores and said cross tube out of said beams as a unit;
applying a second force to the metal outer member of said one bushing to push it out of one of said beams;
applying a force to the outer metal member of said other bushing to push it out of the other beam;
positioning an apertured plate over the end of said bushing lying on the side of said beam which is adjacent a wheel with the aperture in said plate in alignment with said bushing;
connecting said plate to force transmitting means positioned over the other end of said bushing in alignment therewith; and
actuating said force transmitting means to apply a force to said other end of said bushing to push it out through said aperture.

References Cited by the Examiner

UNITED STATES PATENTS

| | | | |
|---|---|---|---|
| 1,897,737 | 2/33 | Snarr | 29—263 |
| 2,860,407 | 11/58 | Grunder et al. | 29—266 |
| 2,999,311 | 9/61 | McDonald et al. | 29—401 |
| 3,007,242 | 11/61 | Hauer et al. | 29—401 |
| 3,020,628 | 2/62 | Sage | 29—200 |
| 3,031,741 | 5/62 | Bernadi | 29—200 |

WHITMORE A. WILTZ, *Primary Examiner.*

THOMAS H. EAGER, *Examiner.*